Patented Sept. 30, 1952

2,612,520

UNITED STATES PATENT OFFICE 2,612,520

PREPARATION OF CARBOXYLIC ACIDS

Thomas F. Doumani, Los Angeles, and Clarence S. Coe, Rolling Hills, Calif., assignors to Union Oil Company of California, Los Angeles, Calif., a corporation of California No Drawing. Application October 28, 1949, Serial No. 124,234

12 Claims. (Cl. 260—533)

This invention relates to the preparation of carboxylic acids, and in particular concerns an improved process for the synthesis of certain mono-carboxylic acids from unsaturated hydrocarbons, carbon monoxide, and water.

It is known that aliphatic mono-carboxylic acids may be prepared by reaction between olefine hydrocarbons, carbon monoxide, and water at elevated pressures and temperatures. The reaction which takes place may be represented by the equation

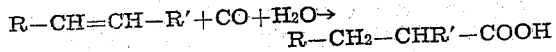

wherein R and R' each represents hydrogen or an alkyl radical. This reaction is normally accompanied by various undesirable side reactions, particularly decomposition of the acid product and polymerization of the olefine reactant, and in order to suppress such side reactions it has been found necessary to employ the carbon monoxide and water in large excess and to carry out the reaction at the lowest temperature which is consistent with economical operation. A number of materials, notably inorganic halides and certain inorganic acids, have been found to catalyze the desired reaction and thus permit the use of lower reaction temperatures, but none of the catalysts heretofore proposed has been sufficiently effective to permit operation of the process on a commercial scale. Also, many of the proposed catalysts have been of the contact type comprising an active material supported or adsorbed on a solid active or inactive base, and the use of such catalysts requires the provision of special equipment for handling and containing the catalyst as well as for its periodic regeneration or replacement. Others of the proposed catalysts are liquids which, while they are for the most part more readily handled than solid catalysts, are difficult to separate completely from the product. Others of the proposed catalysts are highly corrosive or are hazardous to handle.

It is accordingly an object of the present invention to provide an improved process for the synthesis of mono-carboxylic acids from unsaturated hydrocarbons, carbon monoxide, and water.

Another object is to provide improved catalysts for the reaction between unsaturated hydrocarbons, carbon monoxide, and water to form mono-carboxylic acids.

A further object is to provide for said reaction catalysts which are readily handled and which need not be regenerated or recovered.

Other objects will be apparent from the following detailed description of the invention, and various advantages not specifically referred to herein will occur to those skilled in the art upon employment of the invention in practice.

We have found that the above objects and attendant advantages may be realized by employing an aliphatic, cyclo-aliphatic, or aromatic-substituted aliphatic mono-carboxylic acid as a catalyst for the aforesaid reaction between unsaturated hydrocarbons, carbon monoxide, and water. More particularly, we have found that said reaction is self-catalyzed, i. e., the product of the reaction is itself a catalyst for the reaction. Such phenomenon is highly unusual and constitutes an exception to the law of mass action.

In the present instance, we have found that by providing a small amount of one of the aforementioned acids in the initial reaction mixture comprising the unsaturated hydrocarbon, carbon monoxide, and water, the reaction may be effected at relatively low temperatures to form the acid product in good yield. By carrying out the reaction at low temperatures, undesirable by-product formation is notably decreased and it is not necessary to employ the carbon monoxide reactant in large excess as has previously been done. Furthermore, the mono-carboxylic acids which are employed as catalysts are either liquids or can be dissolved in the water reactant and handled as liquids, thus obviating the need for special solids-handling equipment. When the catalyst employed is identical with the carboxylic acid product, as is usually the case, the problem of separating the catalyst from the product becomes non-existent, and even when the catalyst differs from the product such separation may readily be effected, as by simple fractional distillation. Other advantages of employing the present catalysts will be apparent to those skilled in the art. We have further found that the principle upon which the invention is based, i. e., that of self-catalysis, is applicable to the preparation of carboxylic acids from cyclic mono-olefines and aromatic-substituted mono-olefines as well as from straight- or branched-chain mono-olefines.

The invention accordingly consists in the process of subjecting a reaction mixture initially comprising carbon monoxide, water, an unsaturated hydrocarbon selected from the group consisting of mono-olefines, cyclic mono-olefines, and aromatic-substituted mono-olefines, and a catalytic amount of an aliphatic, cyclo-aliphatic, or aromatic-substituted aliphatic mono-carboxylic acid to an elevated reaction temperature and pressure to obtain an aliphatic, cyclo-aliphatic, or aromatic-substituted aliphatic mono-carboxylic acid. The reaction which occurs may be represented by the equation:

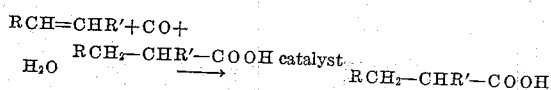

wherein R and R' each represents hydrogen or an alkyl or aromatic hydrocarbon radical, or R and R' together represent an alkylene radical.

As previously stated, the unsaturated hydrocarbon reactant may be a straight- or branched-chain mono-olefine, a cyclic mono-olefine, or a mono-olefine bearing an aromatic hydrocarbon substituent. From a practical standpoint, the olefines most usually employed will be lower aliphatic mono-olefines containing from 2 to 8 carbon atoms since the acid products obtained from such olefines find widest commercial application. As examples of such olefines there may be mentioned ethylene, propylene, butene-1, butene-2, 2-methylpropene, pentene-1, pentene-2, 2-methylbutene-1, 3-methylbutene-1, hexene-1, hexene-2, 2-methylpentene-1, 2,3-dimethylbutene-1, heptene-1, heptene-2, 2,3,3-trimethylbutene-1, octene-1, octene-2, 2-methylheptene-1, di-isobutylene, etc. However, the process of the invention may be applied to the synthesis of carboxylic acids from higher mono-olefines, such as decene-1, triisobutylene, cetene, etc., as well as cyclic mono-olefines, such as cyclopentene, cyclohexene, methylcyclohexene, dimethylcyclopentene, cycloheptene, cyclo-octene, etc., and aromatic-substituted mono-olefines, such as styrene, alpha-methyl styrene, vinyl-naphthalene, diphenyl-ethylene, etc. In the interests of obtaining the carboxylic acid product in as pure a form as possible it is usually desirable that the olefine reactant be employed in relatively pure form and that the catalyst be identical with the carboxylic acid product.

The proportions in which the mono-olefine, carbon monoxide, water, and aliphatic mono-carboxylic acid catalyst are employed may be varied considerably, and little advantage lies in employing the carbon monoxide and water in large excess as has been the previous practice. Accordingly, the reactants may suitably be employed in equimolecular proportions as dictated by the reaction equation. Usually, however, the water is employed somewhat in excess to facilitate handling of the acid product, and in general it may be stated that it is preferred to employ from about 0.5 to about 1.5 moles of carbon monoxide and from about 1.0 to about 3.0 moles of water per mole of mono-olefine. The aliphatic mono-carboxylic acid catalyst may likewise be employed in widely varying proportions ranging from as little as 0.1 per cent or less to as much as 50 per cent of the combined weight of the reactants. Since the catalyst is in most instances identical with the product, no difficulty is raised by employing the catalyst in relatively large amounts, and in some instances it is preferred to employ the catalyst in amounts representing as much as 35-40 per cent of the combined weight of the reactants in the interests of reducing byproduct formation as much as possible. Similarly, in some instances it is preferred to employ a relatively large excess of the mono-olefine, e. g., from about 2 to about 5 moles of olefine per mole of carbon monoxide. In such case, upon completion of the reaction the excess olefine is available at an elevated temperature and pressure, and may be recycled or directly employed elsewhere, e. g., in high pressure polymerization processes.

The optimum conditions for effecting the reaction depend upon the particular reactants and the relative proportions in which they are employed, as well as upon the manner in which the reaction is carried out. Also, the various reaction conditions are interdependent, lower temperatures requiring higher pressures and longer reaction times, shorter reaction times requiring higher temperatures and higher pressures, etc. In general, however, satisfactory results are attained when employing reaction temperatures between about 150° and about 450° C., preferably between about 250° and about 350° C., and pressures between about 2000 and about 10,000 pounds per square inch. Under these conditions of temperature and pressure the reaction takes place fairly rapidly, and is substantially complete in a relatively short time. However, in order to maintain close control of the temperature it is preferred to bring the reactant mixture up to the desired reaction temperature slowly over a period of ½ hour or more depending upon the quantity of reactants and the design and capacity of the reactor. Similarly, in order to insure complete reaction, it is preferred to hold the mixture at the reaction temperature for ½ hour or more, after which time it may be rapidly cooled to room temperature and treated for the separation and purification of the aliphatic mono-carboxylic acid product.

The following examples will illustrate several ways in which the principle of the invention has been applied, but are not to be construed as limiting the same.

*Example I*

A stainless steel rocking autoclave was charged with 2.0 moles of water and 0.5 mole of propionic acid. A mixture of 0.87 mole of ethylene and 1.04 moles of carbon monoxide was then introduced into the autoclave under a pressure of about 2000 p. s. i. g. at about 17° C. The autoclave and contents were then carefully heated to a temperature of about 290° C. over a period of about 4 hours and were maintained at this temperature for about 1.5 hours, whereupon they were quickly cooled and the liquid product was removed. During the heating period the pressure within the autoclave rose to a maximum of about 5500 p. s. i. g., and upon cooling to atmospheric temperature the pressure dropped to about 500 p. s. i. g. The liquid product removed from the autoclave was found to contain 1.12 moles of propionic acid, corresponding to a yield of about 71 per cent of theoretical, based on the ethylene employed.

*Example II*

Approximately 1.66 moles of water were placed in the autoclave, and a mixture of 0.51 mole of ethylene and 0.97 mole of carbon monoxide was introduced under a pressure of about 2000 p. s. i. g. at about 20° C. The autoclave and contents were then carefully heated over a period of about 3.5 hours to a temperature of about 385° C. whereupon reaction was initiated as indicated by the pressure within the autoclave rapidly increasing to about 5220 p. s. i. g. Heating was continued at this temperature for about 2.5 hours, after which the autoclave was cooled to about 0° C. and the contents were removed. It was found that the yield of propionic acid was only about 38 per cent, based on the amount of ethylene employed.

It will be noted from a comparison of this example with Example I that the addition of a quantity of the propionic acid product to the initial reaction mixture not only effected a lowering of the temperature at which the reaction took place but also substantially doubled the yield of propionic acid obtained.

*Example III*

A mixture of 2.0 moles of water and 0.5 mole of butyric acid was introduced into the autoclave, and 0.72 mole of ethylene and 0.90 mole of carbon monoxide were pressured in under a pressure of 2000 p. s. i. g. at about 25° F. The autoclave and contents were carefully heated to a temperature of about 327° C. over a 3-hour period. Heating was continued at this temperature for about 1 hour, whereupon the autoclave was cooled and the contents were removed. During the heating the pressure within the autoclave rose to a maximum of about 5820 p. s. i. g. The yield of propionic acid obtained was about 75 per cent of theoretical, based on the ethylene employed.

It will be apparent to those skilled in the art that the process of the invention may be carried out in various ways employing various types of equipment and engineering techniques devised for carrying out chemical reactions at elevated pressures and temperatures. The reaction may be effected in a batch-wise, semi-continuous, or continuous manner, and various means, e. g., fractional distillation, solvent extraction, etc., may be employed for isolating and purifying the aliphatic mono-carboxylic acid product. Inasmuch as the reaction mixture is corrosive towards the usual metals of construction under the reaction conditions, the reaction vessel is preferably constructed of, or lined with, a corrosion-resistant material. Metals such as tantalum, silver, and copper have been employed for this purpose. In general, any of the operating techniques and types of equipment which have been heretofore applied in carrying out the reaction with the previously known catalysts may be applied to the practice of the present process.

While the process of the invention has been herein described as making use of an aliphatic mono-carboxylic acid as the sole catalyst for the reaction involved, such catalyst may advantageously be employed in combination with any of the previously known catalysts for the reaction, e. g., phosphoric acid, boric acid, metal halides such as the chlorides, bromides and iodides of sodium, calcium, magnesium, iron, zinc, cobalt, nickel, tin, copper, aluminum, etc., metal halides in combination with hydrogen halides, complex metal salts such as chromium vanadate, acid salts of acidic oxide elements such as phosphorus, arsenic, molybdenum, bismuth, chromium, zinc, etc., acidic oxides, etc. The aliphatic mono-carboxylic acid catalysts of the present invention are particularly effective when employed in combination with a catalyst selected from the class consisting of the metals iron, cobalt, and nickel and the alloys, oxides, and salts thereof.

The following example will illustrate the use of one of the present aliphatic mono-carboxylic acid catalysts in combination with a metal salt catalyst, but is not to be construed as limiting the invention:

*Example IV*

An autoclave similar to that employed in Example I was charged with 2.0 moles of water, 0.5 mole of propionic acid, 0.0025 mole of nickel acetate tetrahydrate, 0.59 mole of ethylene, and 0.75 mole of carbon monoxide. The autoclave and contents were heated to a temperature of about 288° C. over a period of about 1.5 hours, during which time the pressure within the autoclave rose from an initial value of about 2000 p. s. i. g. to about 4920 p. s. i. g. Heating was continued at about 280°–290° C. for 2 hours, after which the autoclave was cooled and the contents withdrawn. The yield of propionic acid obtained was about 84.6 per cent of theoretical, based on the quantity of ethylene employed. In a comparative run in which the propionic acid catalyst was omitted from the reaction mixture, reaction did not take place to any substantial extent until the temperature was raised to about 400° C., and as a consequence of by-product formation occurring at this high temperature the yield of propionic acid obtained was quite low.

Other modes of applying the principle of our invention may be employed instead of those explained, change being made as regards the methods or materials employed provided the step or steps stated by any of the following claims, or the equivalent of such stated step or steps, be employed.

We, therefore, particularly point out and distinctly claim as our invention:

1. In a process wherein a reaction mixture consisting essentially of a mono-olefinic hydrocarbon selected from the class consisting of aliphatic, cyclo-aliphatic and aromatic-substituted aliphatic mono-olefinic hydrocarbons, carbon monoxide and water is caused to react at an elevated temperature and pressure to form the mono-carboxylic acid corresponding to said mono-olefinic hydrocarbon, the steps which consist in adding to said reaction mixture prior to initiation of the reaction a catalytic amount of mono-carboxylic hydrocarbon acid selected from the class consisting of aliphatic, cyclo-aliphatic, and aromatic-substituted aliphatic mono-carboxylic hydrocarbon acids, and effecting the reaction in the absence of catalytic agents other than said added mono-carboxylic hydrocarbon acid.

2. The process of claim 1 wherein the mono-carboxylic acid catalyst is identical with the mono-carboxylic acid product.

3. The process of claim 1 wherein the reaction temperature is between about 150° C. and about 450° C. and the pressure is between about 2000 and about 10,000 pounds per square inch.

4. The process of claim 1 wherein the reaction mixture contains from about 0.5 to about 1.5 moles of carbon monoxide and between about 1.0 and about 3.0 moles of water per mole of the mono-olefine, and the mono-carboxylic acid catalyst is present in an amount representing between about 0.1 and about 50 per cent of the combined weight of the mono-olefine, carbon monoxide, and water.

5. In a process wherein a reaction mixture consisting essentially of a mono-olefinic aliphatic hydrocarbon containing from 2 to 8 carbons, carbon monoxide and water is caused to react at an elevated temperature and pressure to form the corresponding aliphatic mono-carboxylic acid, the steps which consist in adding to said reaction mixture prior to initiation of the reaction a catalytic amount of an aliphatic mono-carboxylic acid having the formula

wherein R and R′ each represents a substituent selected from the class consisting of hydrogen and aliphatic hydrocarbon radicals, and effecting the reaction in the absence of catalytic agents other than said added aliphatic mono-carboxylic acid.

6. The process of claim 5 wherein the aliphatic mono-carboxylic acid catalyst is identical with the aliphatic mono-carboxylic acid product.

7. The process of claim 5 wherein the reaction temperature is between about 150° C. and about 450° C. and the pressure is between about 2000 and about 10,000 pounds per square inch.

8. The process of claim 5 wherein the reaction mixture contains from about 0.5 to about 1.5 moles of carbon monoxide and from about 1.0 to about 3.0 moles of water per mole of the mono-olefine, and the aliphatic mono-carboxylic acid catalyst is present in an amount representing between about 0.1 and about 50 per cent of the combined weight of the mono-olefine, carbon monoxide, and water.

9. In a process wherein a reaction mixture essentially comprising ethylene, carbon monoxide and water is caused to react at an elevated temperature and pressure to form propionic acid, the steps which consist in adding to said reaction mixture prior to initiation of said reaction a catalytic amount of an aliphatic mono-carboxylic acid having the formula $$RCH_2-CHR'-COOH$$

wherein R and R' each represents a substituent selected from the class consisting of hydrogen and aliphatic hydrocarbon radicals, and effecting the reaction in the absence of catalytic agents other than said added aliphatic mono-carboxylic acid.

10. The process of claim 9 wherein the aliphatic mono-carboxylic acid catalyst is propionic acid.

11. The process of claim 9 wherein the reaction temperature is between about 150° C. and about 450° C. and the pressure is between about 2000 and about 10,000 pounds per square inch.

12. The process of claim 9 wherein the reaction mixture contains from about 0.5 to about 1.5 moles of carbon monoxide and from about 1.0 to about 3.0 moles of water per mole of ethylene, and the catalyst is propionic acid in an amount representing between about 0.1 and about 50 per cent of the combined weight of the ethylene, carbon monoxide, and water.

THOMAS F. DOUMANI.
CLARENCE S. COE.

REFERENCES CITED

The following references are of record in the file of this patent:

UNITED STATES PATENTS

| Number | Name | Date |
| --- | --- | --- |
| 1,973,662 | Schalch | Sept. 11, 1934 |
| 2,000,053 | Voil | May 7, 1935 |
| 2,025,677 | Woodhouse | Dec. 24, 1935 |
| 2,448,368 | Gresham et al. | Aug. 31, 1948 |
| 2,448,375 | Larson | Aug. 31, 1948 |
| 2,473,993 | Gresham et al. | June 21, 1949 |
| 2,510,105 | Hedberg | June 6, 1950 |

OTHER REFERENCES

Peck et al.: "Interview with W. J. Reppe," Fiat Final Report #273, pp. 9-11 (October 2, 1945).